US012627473B2

(12) United States Patent
Mahan et al.

(10) Patent No.: US 12,627,473 B2
(45) Date of Patent: May 12, 2026

(54) AUTHENTICATION SERVICE WITH SHARED SESSION TOKENS FOR SHARING AUTHENTICATION

(71) Applicant: Cisco Technology, Inc., San Jose, CA (US)

(72) Inventors: Kyle William Mahan, Ann Arbor, MI (US); Glenn Joseph Stempeck, Livonia, MI (US); Zach Weglarz, Ann Arbor, MI (US); Sebastian Green-Husted, Lansing, MI (US); Ethan Dunnum, South Lyon, MI (US); Denzil Eugene Long, Austin, TX (US); Chris Cassell, Ann Arbor, MI (US); Philip Darin Lowman, Troy, MI (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 18/534,497

(22) Filed: Dec. 8, 2023

(65) Prior Publication Data

US 2025/0112763 A1     Apr. 3, 2025

Related U.S. Application Data

(60) Provisional application No. 63/506,454, filed on Jun. 6, 2023.

(51) Int. Cl.
H04L 9/08          (2006.01)
H04L 9/32          (2006.01)
(52) U.S. Cl.
CPC .......... H04L 9/0825 (2013.01); H04L 9/3213 (2013.01); H04L 9/3247 (2013.01)

(58) Field of Classification Search
CPC ... H04L 9/0825; H04L 9/3213; H04L 9/3247; H04L 63/0807; H04L 63/08; H04L 63/0884; H04L 63/0815; G06F 21/41
See application file for complete search history.

(56) References Cited

U.S. PATENT DOCUMENTS

2012/0210413 A1* 8/2012 Akula ................. H04L 63/0815
                                                   726/8
2014/0189834 A1   7/2014 Metke et al.
                (Continued)

FOREIGN PATENT DOCUMENTS

WO      2022140469 A1   6/2022

OTHER PUBLICATIONS

International Search Report and Written Opinion for International Application No. PCT/US2024/032817, mailed Aug. 26, 2024, 12 Pages.

*Primary Examiner* — Henry Tsang
(74) *Attorney, Agent, or Firm* — Polsinelli P.C.

(57)          ABSTRACT

Disclosed are systems, apparatuses, methods, computer readable medium, and circuits for sharing multifactor authentication with shared session tokens using an authentication service. According to at least one example, a method includes: in response to receiving a request to check an authentication status from a first application, transmitting a first message to an authentication service including shared information; providing first authentication credentials related to a first authentication to the authentication service; and receiving a message related to a second authentication to bypass the second authentication.

20 Claims, 10 Drawing Sheets

(56) References Cited

U.S. PATENT DOCUMENTS

| 2016/0142409 | A1 | 5/2016 | Frei et al. | |
| 2022/0217132 | A1* | 7/2022 | Ahmed | H04L 63/0884 |
| 2022/0255931 | A1* | 8/2022 | Avetisov | H04L 9/3247 |

* cited by examiner

450

700 ⟍

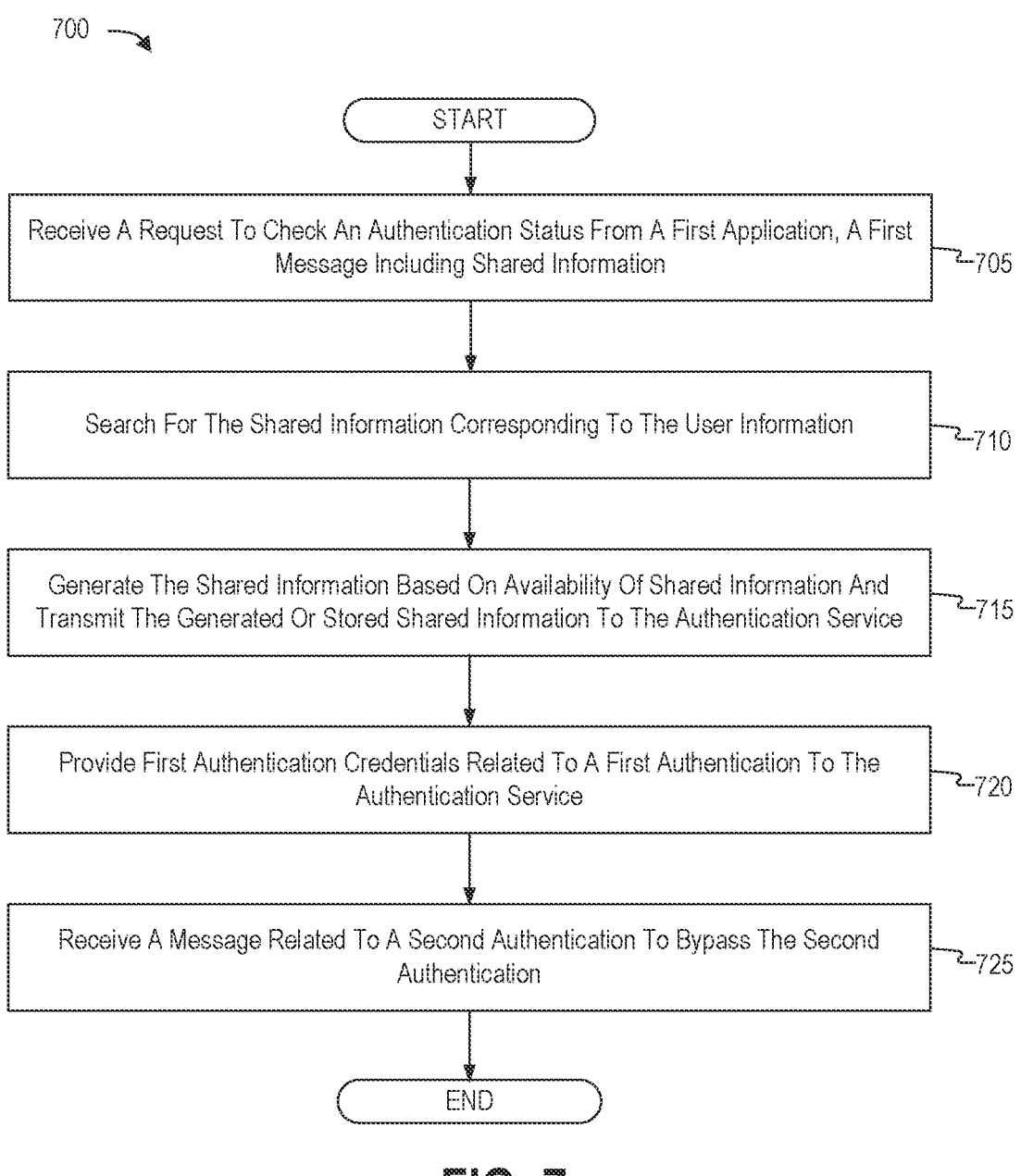

START

Receive A Request To Check An Authentication Status From A First Application, A First Message Including Shared Information ⎯705

Search For The Shared Information Corresponding To The User Information ⎯710

Generate The Shared Information Based On Availability Of Shared Information And Transmit The Generated Or Stored Shared Information To The Authentication Service ⎯715

Provide First Authentication Credentials Related To A First Authentication To The Authentication Service ⎯720

Receive A Message Related To A Second Authentication To Bypass The Second Authentication ⎯725

END

FIG. 7

AUTHENTICATION SERVICE WITH SHARED SESSION TOKENS FOR SHARING AUTHENTICATION

CROSS-REFERENCE TO RELATED APPLICATIONS

This application claims priority to U.S. Provisional Patent Application No. 63/506,454, filed on Jun. 6, 2023, entitled "SHARED SESSION STATE," the content of which is incorporated herein by reference in its entirety.

TECHNICAL FIELD

The present technology pertains to an authentication service, and more particularly, to authentication service with shared session tokens for sharing authentication.

BACKGROUND

An authorization system for a computer is a critical component of ensuring data security and controlling access to resources within a computing environment. It involves the implementation of policies and mechanisms that govern the granting or denying of permissions to users or entities based on their identity, roles, or privileges. The authorization system establishes a framework to enforce restrictions and permissions, preventing unauthorized users from accessing sensitive information or performing actions beyond their authorized scope. This system typically utilizes authentication mechanisms, such as passwords, biometrics, or digital certificates, to verify the identity of users before granting them access. It also encompasses the management of user roles and permissions, allowing administrators to define and assign fine-grained access controls based on specific requirements and responsibilities. By implementing an effective authorization system, organizations can safeguard their data, mitigate security risks, and maintain compliance with regulatory standards.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 7 illustrates a flowchart of an example process implemented in accordance with some aspects of the disclosure.

DESCRIPTION

Figure 1:
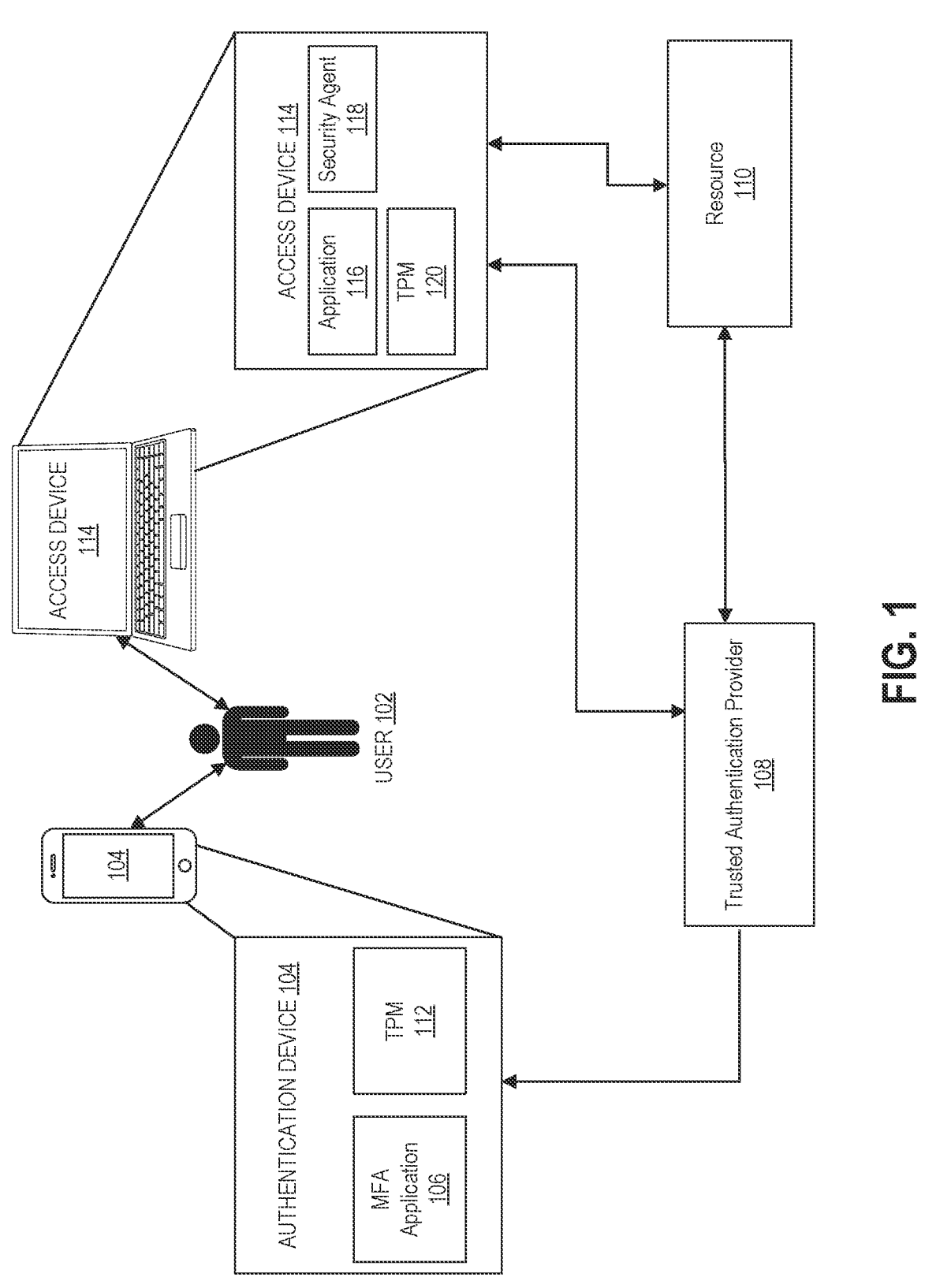
FIG. 1 illustrates an example environment utilizing a multi-factor authentication (MFA) system in accordance with some aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Overview

Disclosed are systems, apparatuses, methods, computer readable medium, and circuits for sharing authentication with shared session tokens using an authentication service. According to at least one example, a method includes: in response to receiving a request to check an authentication status from a first application, transmitting a first message to an authentication service including shared information; providing first authentication credentials related to a first authentication to the authentication service; and receiving a message related to a second authentication to bypass the second authentication.

In another example, a computing system for sharing authentication with shared session tokens using an authentication service is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the computing system to: in response to receiving a request to check an authentication status from a first application, transmit a first message to an authentication service including shared information; provide first authentication credentials related to a first authentication to the authentication service; and receive a message related to a second authentication to bypass the second authentication.

In some aspects, one or more of the apparatuses described herein is, is part of, and/or includes a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a vehicle or a computing system, device, or component of a vehicle, a wearable device (e.g., a network-connected watch or other wearable device), a wireless communication device, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

DETAILED DESCRIPTION OF EXAMPLE EMBODIMENTS

Authentication has become a time-consuming process that, while still necessary, can impact and frustrate users. For example, in an enterprise context, a user may need to reauthenticate different enterprise applications during the course of business hours. In many cases, applications cannot use operating system authentication information and must use a supplemental authentication, such as using an open authorization (OAuth 2.0) proxy to query the user for authentication credentials. Further exacerbating the repeated authentications are multifactor authentication requirements. The time spent during these authentications is repetitive and interrupts the core functions of the user. While authentication may be necessary, interruptions to the core functions of the user can have detrimental impacts, increase stress, and affect user productivity.

The disclosed technology addresses the foregoing generating a shared session state that can be reused by different sources that require authentication. In some cases, an identification token is generated and used to securely identify a client device. The identification token is used to generate session information associated with each source, and the identification token is encrypted using various encryption techniques (e.g., asymmetric, symmetric, hashing, etc.) to validate responses.

FIG. 1 illustrates an example environment utilizing a multifactor authentication (MFA) system in accordance with some aspects of the present technology. User 102 can gain authorized access to resource 110 by using authentication device 104. User 102 can be any user including an employee, contractor, client, member of an organization, private individual, etc. attempting to access a service. The authentication device 104 can be hardware, software-only, or combinations thereof. The authentication device 104 can be a mobile device or a personal computer.

Resource 110 can be any service, resource, device, or entity which requires authentication of user 102. For example, resource 110 can be a social media service, bank, hospital, motor vehicle department, bar, voting system, Internet of Things (IOT) device, or access device. In some embodiments, resource 110 can be accessed by user 102 through an access device 114, such as a mobile phone or personal computer. In some embodiments, resource 110 can be accessed by user 102 through an application 116 on an access device 114 that is specifically designed for accessing resource 110, or through a more general application 116 that can access multiple services, such as a web browser, or portions of an operating system. In some embodiments, resource 110 can be a plurality of resources, such as a network or enterprise system.

Resource 110 can authenticate the identity of user 102 on its own through use of an authentication mechanism and can utilize the trusted authentication provider 108 to provide an additional factor of authentication. For example, user 102 can attempt to access the resource 110 using the access device 114. In some embodiments, the access device 114 can also be the authentication device 104, such as when user 102 attempts to access the resource 110 using an app or browser on authentication device 104. The resource 110 can perform a first authentication mechanism by interacting with the access device 114. Thereafter, the resource 110 can request an additional authentication using authentication device 104.

In some embodiments, the additional authentication can include requesting a code generated by the authentication device 104. For example, the MFA application 106 might generate a pseudo-random number using a mechanism agreed upon with resource 110. The user 102 can operate the authentication device 104 to cause the MFA application 106 to generate the pseudo-random number, which user 102 can then enter into the access device 114 to achieve the additional authentication. In some embodiments, if the authentication device 104 is equipped with a trusted platform module (TPM) 112 for generating random numbers and encrypting. For example, the MFA application 106 can utilize the TPM 112 to generate the pseudo-random number.

In some embodiments, the additional authentication can include requesting a code or authorization generated by the authentication device 104 by making the request through the trusted authentication provider 108. For example, the resource 110 can pass information identifying the user 102 to the trusted authentication provider 108 with a request for an additional authentication. The trusted authentication provider 108 can send a request (e.g., a push request) for authentication to the authentication device 104, which is known to be a device associated with the user 102. The user can respond to the request for authentication on the authentication device 104 by interacting with the MFA application 106 to perform the required actions. When the required actions are properly performed, the MFA application 106 can send a communication informing the trusted authentication provider 108 of the successful authentication, and the trusted authentication provider 108 can inform the resource 110 of the successful authentication.

In some embodiments, the additional authentication can include requesting a code generated at resource 110 to be entered at the authentication device 104 by making the request through the trusted authentication provider 108. For example, the resource 110 can pass information identifying the user 102 to the trusted authentication provider 108 with a request for additional authentication. The trusted authentication provider 108 can send a request (e.g., a push request) for authentication to the authentication device 104, which is known to be a device associated with the user 102. In this example, the MFA application 106 presents a user interface requesting that the user 102 enter a code that is presented on the access device 114 that originated from the resource 110. The user can respond to the request for authentication on the authentication device 104 by interacting with the MFA application 106 to perform the required action by entering the code. When the code is properly entered, the MFA application 106 can send a communication informing the trusted authentication provider 108 of the code, and the trusted authentication provider 108 can pass the code to the resource 110 where the resource 110 will consider the additional authentication successful when the received code matches the code sent to the access device 114. In some aspects, the access device 114 may be a TPM 120 for signing content to ensure integrity of communications. For example, the TPM 120 may sign a health report that is transmitted to an authentication service.

In some embodiments, the authentication device 104 and/or the access device 114 can also report context data to the trusted authentication provider 108. As addressed above the authentication device 104 can include the MFA application 106 that can communicate with the trusted authentication provider 108. The access device 114 can include a security agent 118 that can also communicate with the trusted authentication provider 108. The MFA application 106 and the security agent 118 can gather and send information to the trusted authentication provider 108. For example, the information can include biometric, behavioral, and contextual data from user 102. These biometrics can include, for example, fingerprints, facial detection, retinal scans, voice identification, or gait data, among other biometrics. The context data can include a time since the user last interacted with the device, changes to the network connection experienced by the device, information about the integrity of the operating system of the device, information about what operating system and what version of the operating system the device is running, among other examples. This information can be used by the trusted authentication provider 108 to determine if the device should be trusted to be used as part of the authentication process or trusted to access the resource 110. In some instances, the information can indicate that something has changed about the user 102, the authentication device 104, or the access device 114 during an authenticated session with resource 110 can take certain actions depending on a configured policy to access the resource 110.

Figure 2:
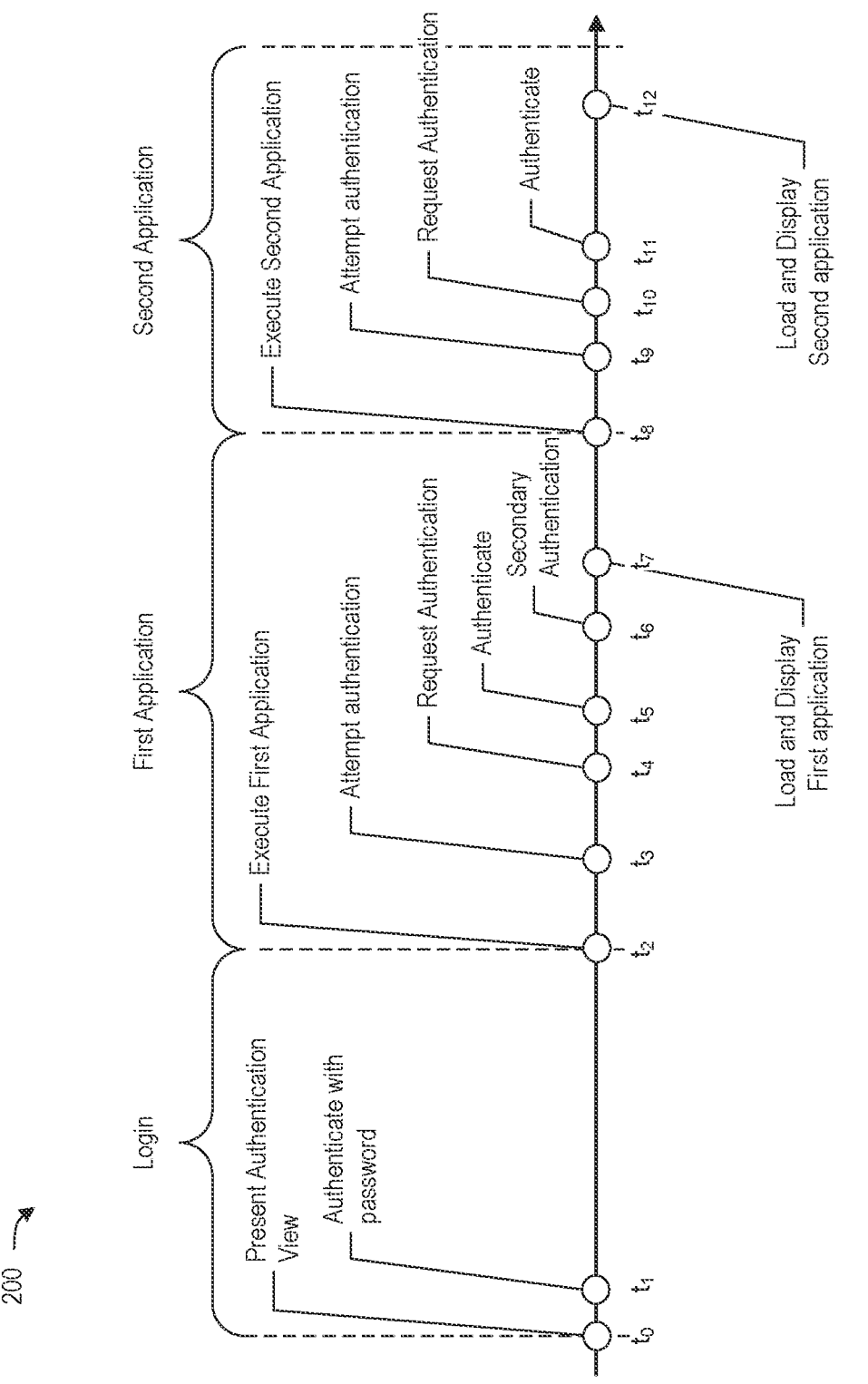
FIG. 2 illustrates a timeline associated with multiple authentications that frequently occur in the course of normal operation.

FIG. 2 illustrates a timeline 200 associated with multiple authentications that frequently occur in the course of normal operation. In this case, the timeline 200 is separated into distinct phases, namely a login phase, a first application phase, and a second application phase. The login phase can be an initial login or a subsequent login after the computing system locks access due to, for example, inactivity. In this case, a user is presented with an authentication view at time to, and the user enters and successfully authenticates with a password at time $t_1$. The password is an example, and the authentication can include other types of authentication mechanisms such as biometric information (e.g., fingerprint), passphrase, hardware encryption key, facial scan, etc.

At time $t_2$, the user executes a first application. In many cases, the first application may need to connect with a third-party service to validate the user with different credentials. For example, the first application may be a subscription-based service and the authentication is required to ensure that the user is authenticated for this product. In other cases, the computing system may be configured by an operations department to comport with specific requirements and may need additional authentication checks to ensure that the user is comporting with operation requirements. At time $t_3$, the computing system may attempt the authentication for the first application. For example, the third-party service may require a token, such as a JavaScript web token (JWT), that is signed by the third-party service to verify the authentication and authorization of the user. In this case, authentication is the process of verifying the identity of the user, for example, using a password. Authorization is the process of verifying that the authenticated user has credentials to use the application. For example, if the first application is an annual subscription, the third-party service verifies that the user's subscription is valid.

In this example, the first application is presumed to not find an existing authentication token and requests authentication at time $t_4$. After the user enters the authentication information and authenticates at time $t_5$, the first application can request a secondary authentication using a different mechanism at time $t_6$. In this case, the secondary authentication may be a different mechanism (e.g., a passcode sent to a mobile device) that provides more evidence of the user's identity. After the secondary authentication, the first application is loaded at time $t_7$ and the user is permitted to operate in the normal course of operation.

In the normal course of operation, a second application will generally be executed. For example, the first application may be an email client. A second application, such as a word processor, or a video editor, will be needed for normal operations. For example, a second application is executed at time $t_8$. Similar to the first application, the second application may need to authenticate the user with respect to the same or a different third-party service. Accordingly, at time $t_9$, the second application attempts authentication and fails, requests authentication at time $t_{10}$, completes authentication at time $t_{11}$, and loads and displays the second application at time $t_{12}$. A second authentication may be presented for the second application and is omitted to limit redundant descriptions. Although not shown, the second application may include a secondary authentication similar to the first application.

The number of authentication attempts can be problematic because of password requirements, rotation of passwords, and other changing authentication mechanisms. But it is still essential that a user provides correct authentication to protect an entity or a person's intellectual assets. No existing solution for authentication exists because of inherent distrust between different systems. Even third-party services that enable a consistent authentication process within an enterprise context still require multiple authentications.

According to aspects of the disclosure, duplicative authentications can be reduced based on sharing authentication information to reduce the number of authentications performed by the user. For example, aspects of the disclosure allow authentications to be shared to prevent duplicative multifactor authentications. As will be further described below, a shared token is created by a separate authentication process at a client and is provided to the server, and the server may inform a service or an application of the existence of the shared token. The shared token is a random string or other value that is generated to temporarily identify a user and a device. For example, a token can be a random number. The client device, when authenticating with an application, can identify the existence of the shared token that is linked to a session token of application, which allow authentication credentials to be shared in some cases to reduce the number of unnecessary authentications and improve user experience.

Figure 3:
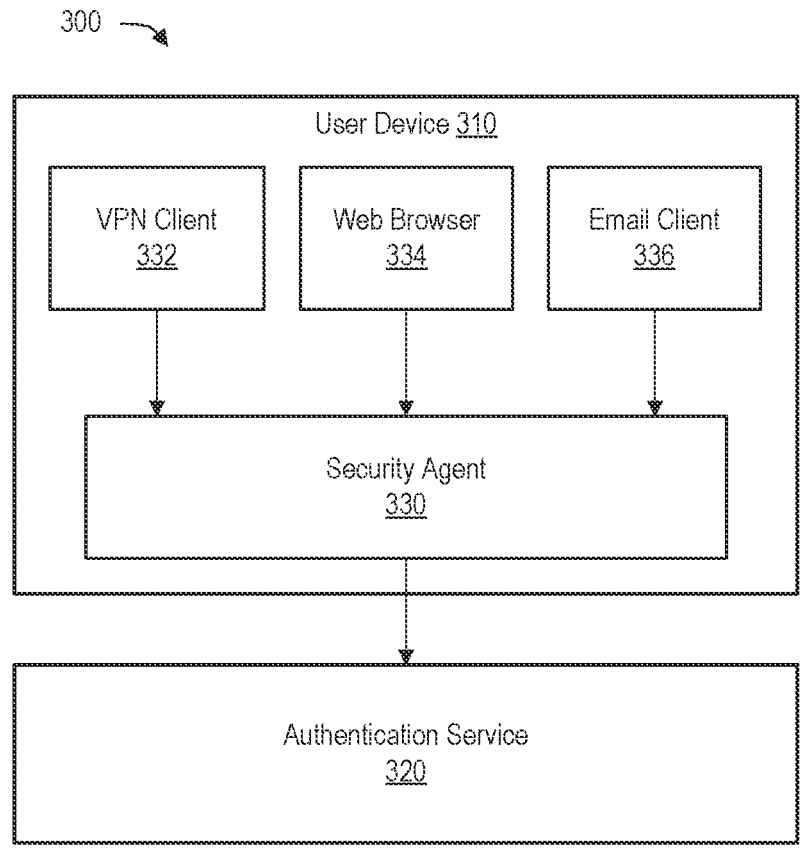
FIG. 3 illustrates a block diagram of an authentication system for remembering sessions that can be extended between different applications in accordance with some aspects of the disclosure.

FIG. 3 illustrates a block diagram of an authentication system 300 for remembering sessions that can be extended between different applications in accordance with some aspects of the disclosure.

The authentication system 300 includes a user device 310 and is connected to an authentication service 320, such as Cisco® Duo services, or any other third-party authentication service (e.g., OAuth, etc.). The user device 310 includes a security agent 330 that is configured to interface with various applications that execute on the user device 310, such as the VPN client 332, the web browser 334, and the email application 336. The security agent 330 may implement a remembered devices features that enable a storage mechanism to remember authentication of a user. For example, the security agent 330 may generate a shared token that can be provided to authentication service to identify a shared session and link authentications by different applications. The shared session is never exposed to any application and sharing of authentications occurs transparently from the perspective of the applications.

For purposes of clarity, the cookie storage may be implemented to store a shared key that can provide authentication in connection with the remember authentication credentials of the user across different applications (e.g., application executing in the browser sandbox that requires authentication, desktop application execute within the device's user space, etc.). In other cases, the shared key may be stored in locations, such as in memory, a TPM as a key-value pair, and so forth. The security agent 330 creates a shared token in a health report and sends the token to the authentication service 320, and the authentication service 320 uses the shared token to identify subsequent authentication attempts from the same user. In some cases, the authentication service 320 can be used between different application domains and unique session identifiers associated with different applications can be generated to reduce the number of authentications. For example, in some cases, the shared token can provide a second authentication (e.g., a multifactor authentication).

The authentication service 320 may be configured to prevent malicious actors to induce the authentication service 320 to share a share token with non-authentication devices. For example, the authentication service 320 may be configured to detect operation of multiple instances of the security agent 330 and not respond in the event multiple instances of the security agent 330 are executing.

In another example, a malicious user can induce another security agent 330 to send a health report from the authentication service 320 including the shared token. The authentication service 320 and the security agent 330 may be configured to limit such operations, such as allowing a shared key to have a maximum lifetime (e.g., 12 hours). Other checks by the security agent 330 and the authentication service 320 may also be implemented to validate authenticity, such as origin validation (e.g., the request from authentication service 320 appears to come from *.duosecurity.com), code signing validation (e.g., the request from the security agent 330 appears to come from a valid application), and user request validation (e.g., the request to the security agent 330 appears to come from the appropriate user of the operating system), and so forth. In another example, instead of a shared token, a cryptographic challenge issued by the authentication service 320 and signed by a private key protected by the TPM of the user device 310 can be used to provide additional security during authentication. This allows the authentication service 320 to authenticate the request and mitigates the leakage concerns of a shared token.

Figure 4A:
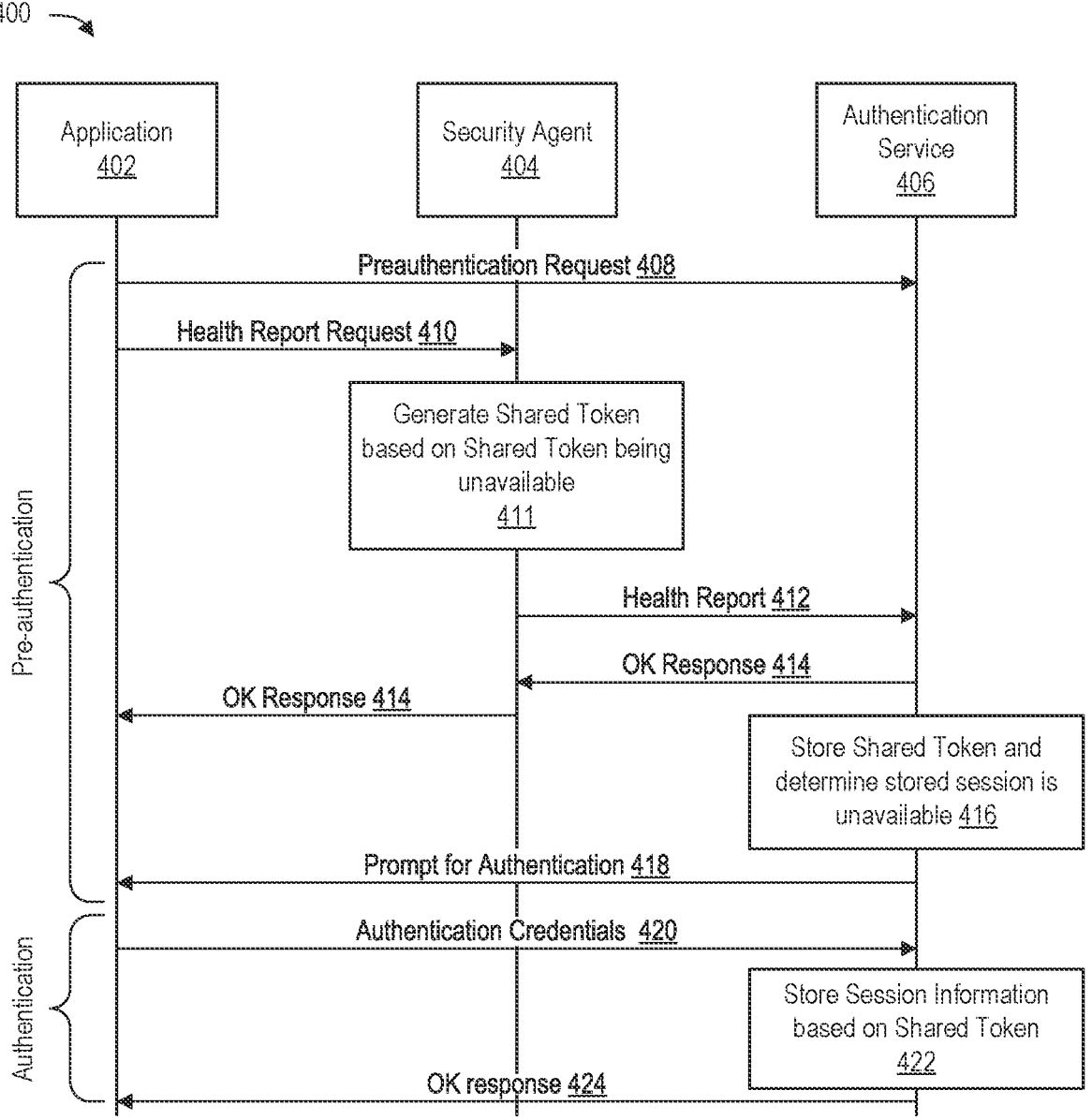
FIG. 4A illustrates a sequence diagram for registering a remembered session in accordance with some aspects of the disclosure.

FIG. 4A illustrates a sequence diagram 400 for registering a remembered session in accordance with some aspects of the disclosure. In the example illustrated in FIG. 4A, a shared token is generated and used to share authentication credentials between a security agent 404 and an authentication service 406 without any knowledge of the shared token by an application 402.

In some cases, the authentication system comprises a user device that is executing an application 402 (e.g., a browser) in conjunction with a security agent 404 and an authentication service 406. Initially, the application 402 sends a pre-authentication request 408 to the security agent 404, which configures the authentication service 406 for operation and a pre-authentication flow. For example, the pre-authentication request 408 may configure various shared information that links the application 402, the security agent 404, and the authentication service 406. In one example, as part of the pre-authentication, the application 402 transmits a health report request 410 to the security agent 404 to request an authentication status. The health report request 410 includes user information such as a transmission identifier (txid) that identifies the application executing on a specific device. For example, a transmission identifier can identify an instance of the application 402. In some cases, the user information can be a token associated with system credentials (e.g., user login, etc.) to uniquely identify a user and device executing the application 402.

At block 411, the security agent 404 is configured to search for session information that is identified by the shared token. When the security agent 404 determines that the shared token is unavailable, the security agent 404 generates a shared token that identifies the user information in the health report request 410. In some cases, a shared token is a random unique value such as, for example, a 128-bit random value. The security agent 404 sends a health report 412 to the authentication service 406 including the shared token and the session information. The authentication service 406 provides an OK response 414 indicating successfully receiving the request, which can be used by the security agent 404 to identify various issues (e.g., lack of network connection), which is further provided to the application 402.

At block 416, the authentication service 406 receives the health report and searches for a remembered session that identifies the user and the device based on the shared token at block 416. The authentication service 406 identifies that there is no valid session and then sends a prompt for authentication 418 to the application 402. After input of authentication credentials by the user at the application 402, the application 402 transmits the authentication credentials 420 to the authentication service 406 and, based on receiving valid authentication credentials, the authentication service 406 stores a remembered session based on the shared token at block 422. For example, the authentication service 406 can create a remembered session corresponding to the user and the device at block 422. The authentication service 406 responds with an OK response 424 indicating successful authentication to the application 402. In one illustrative example, the authentication service 406 can generate a cookie for the application 402 that links the application 402 that links the stored session at the authentication service 406 to the instance of the application 402. In one example, the cookie can be used to bypass later multifactor authentications at the same device. The shared session can also be used to link authentication of other applications.

Figure 4B:
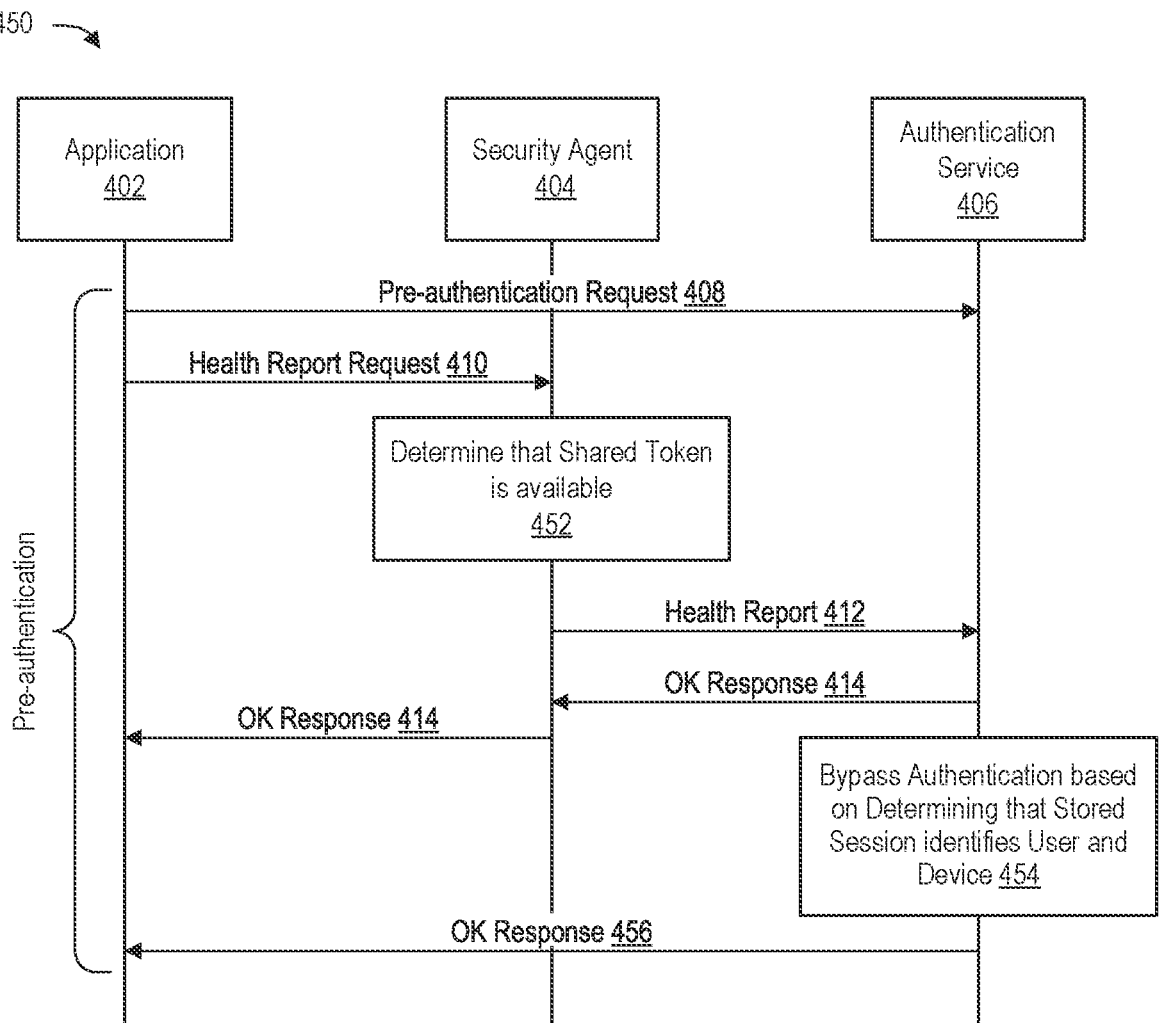
FIG. 4B illustrates a sequence diagram for authenticating an application using a remembered session in accordance with some aspects of the disclosure.

FIG. 4B illustrates a sequence diagram 450 for authenticating an application using a remembered session in accordance with some aspects of the disclosure. Similar to the sequence diagram 400, the security agent 404 sends a pre-authentication request 408 and a health report request 410 as described above. The security agent 404 receives the health report request 410 and searches for a shared token based on information in the health report request 410. In this case, the shared token is available, and the security agent sends the health report 412 with the shared token to the authentication service 406. At block 452, the authentication service 406 receives the health report 412 and then searches for a remembered session based on information in the health report 412. Because the user was previously authenticated in connection with the shared token (e.g., as shown in FIG. 4A), the authentication service 406 identifies a remembered session for the user and the device and then responds with an OK response 456 that indicates that the authentication was successful based on stored credentials.

In some aspects, a session token can be created by the client and can be shared with a server and uniquely identifies aspects of the client device and the user associated with the security agent 404. In this case, the session token is provided to an authentication server, which stores the token and can share the session token with other authenticating services, thereby enabling other authenticating services to be remembered to reduce the number of authentication and supplemental authentications.

In some aspects, an application may connect to the security agent and request the security agent to send a report to an authentication service. The report may include identity information that uniquely identifies the user of the device. If the user has recently authenticated from the same device, the authentication service may remember the user, allowing the user to skip additional authentication checks. Existing solutions use a browser cookie to identify a user on a device, which is specific to a domain and cannot be shared between services. Although FIG. 4B illustrates bypassing an authentication of the application 402, there are various permutations of this example. For example, a supplemental authentication in a multifactor authentication process may be bypassed. In some cases, authentication of different applications (e.g., application 402 in FIG. 4B may be different from application 402 in FIG. 4A) may be bypassed.

FIGS. 4A and 4B illustrate a shared token that may be subject to interception in some cases (e.g., a man-in-the-middle attack) and the token may be used to spoof authentications. In some aspects, the pre-authentication process may include the generation of a key pair (e.g., an asymmetric key pair controlled by a security agent) for signing traffic between a security agent and an authentication service. For example, during a registration process, an application of the authentication service can generate an asymmetric key pair and register the public key with the authentication service. Registration can happen automatically on first use, or for additional security, can be set up manually by an administrator prior to first use. Each future report sent to the authentication service is signed using the private key at the client device, and the authentication service validates the signed message with the public key. A valid signature provides proof of ownership of the key to the authentication service. A hardware security module, such as a Trusted Platform Module (TPM), may also generate and store a private key of the key pair to guarantee that the private key is unique and non-exportable (e.g., to an incepting device).

In contradistinction to a browser cookie, the private key cannot be moved or copied to another computer and provides an extra layer of security.

In this case, no sensitive information is exchanged directly between the client application (e.g., a web-based application) and the authentication application. All identifying information is exchanged locally (e.g., between a browser and another authentication application, or between the authentication application and the authentication service. The client application (e.g., the application requiring authentication) is not exposed to the shared token (or the private key), signature, or health report, and the security agent is not exposed to the user's authentication credentials.

Figure 5:
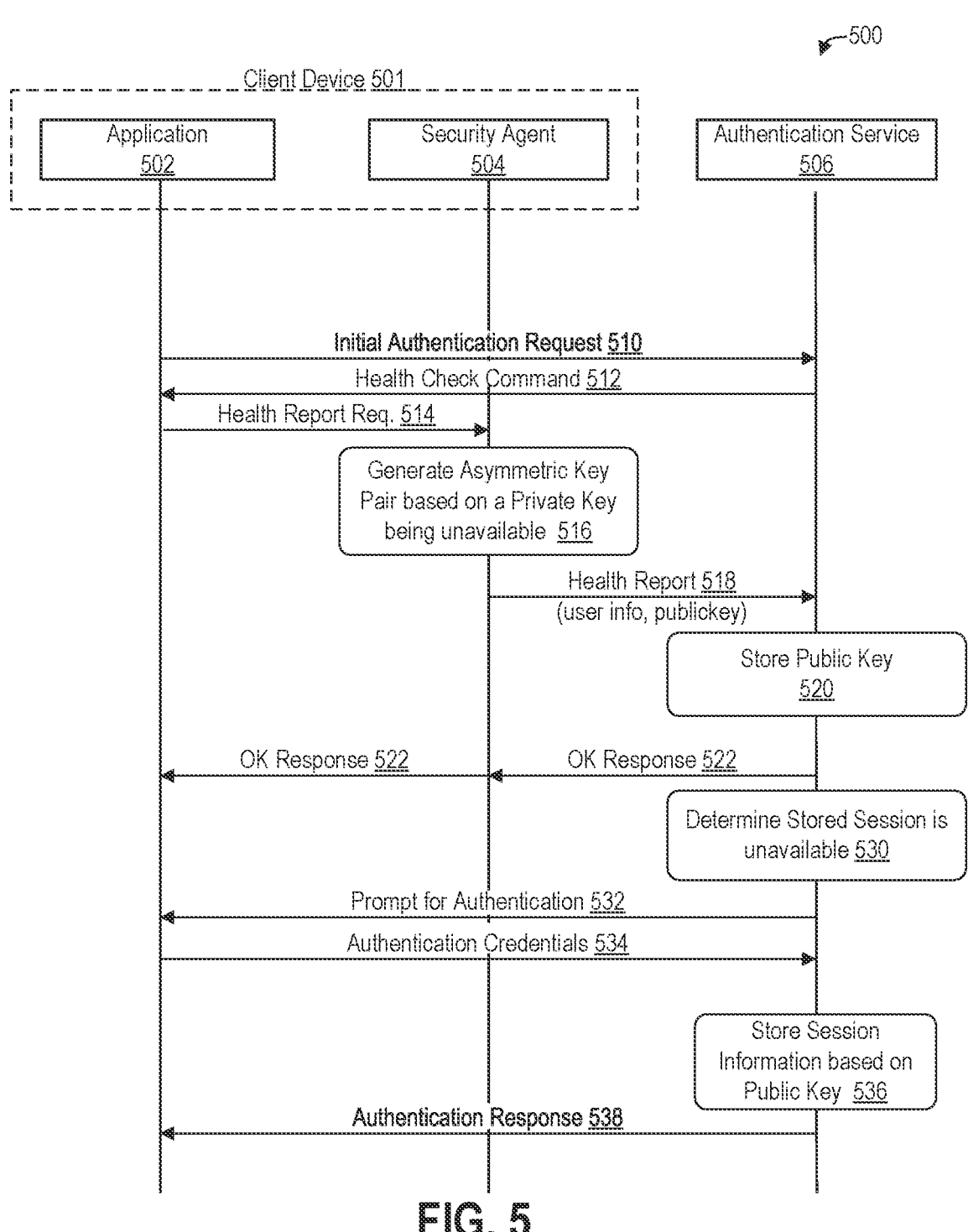
FIG. 5 illustrates a sequence diagram illustrating creation of a shared session in accordance with some aspects of the disclosure.

FIG. 5 illustrates a sequence diagram 500 illustrating creation of a shared session in accordance with some aspects of the disclosure. In some aspects, an application 502 and a security agent 504 are executing on a client device 501 and enable a secure connection and secure authentication with an authentication service 506. The authentication service 506 may include multiple services to separate different functions (e.g., an identity service for authenticating identity, a health service for identifying a health of an authentication, etc.), but is illustrated as a single service for simplicity.

In some aspects, the security agent 504 may generate an asymmetric key-pair and transmit a public key of the asymmetric key-pair to the authentication service 506. The private key may be stored, for example, in a TPM and only the security agent 504 may be able to access the private key. As will be described below, the security agent 504 signs messages with the private key and the authentication service 506 validate the authenticity of the messages based on the signatures. The asymmetric key-pair can be generated at various times, for example during an initial authentication or upon a new instance of the security agent 504, for example.

The application 502 may initiate a pre-authentication request 510 to the authentication service 506, and the authentication service 506 sends a health check command 512 that requests the application 502 to perform an authentication health check with the security agent 504. The application 502 then transmits a health report request 514 to the security agent 504 and includes user information associated with the client device 501 of the application 502. At block 516, the security agent 504 searches for a private key corresponding to the user information. In the event the security agent 504 does not identify the private key, the security agent is configured to generate an asymmetric key-pair (e.g., a private key and a public key).

The security agent 504 then sends a health report 518 to the authentication service 506, including the public key and the user information. The public key can be used in place of a shared token to identify the user and device in subsequent communications. For example, a subsequent health report 518 may include a signature and the authentication service 506 may use public key to verify that the signature is valid and provided by the security agent 504. In some cases, the health report may also be encrypted.

At block 520, the authentication service 506 receives the health report 518 and may store the public key at block 520. For example, the authentication service 506 may store a health report of the authentication of the client device 501 and the public key may be stored in the health report. The storage of the public key is conditional on how device enrollment is configured. For example, the public key may not be stored when an existing key is configured based on an endpoint identifier, or when the endpoint identifier is not listed a device inventory database. The authentication service 506 sends an OK response 522 to the application 502 to indicate successful reception of the health report request.

At block 530, the authentication service 506 determines that the public key is not associated with an existing session of the client device 501 of the application 502. In that case, the authentication service 506 generates session information that is associated with the client device 501 and/or the application 502 based on the user information provided by the application 502 in the health report request 514. For example, the user information can identify various information such as an identifier corresponding to an instance of the application 502. The user information can also be a token that identifies a particular user login into an operating system of the client device 501. The session information is stored within the authentication service 506 and can be used to verify information, such as the validity of a cookie of a browser or if other information from a client device deviates to indicate a potential attack.

The authentication service 506 sends a prompt for authentication 532 to the application 502 to request input of authentication credentials (e.g., username/password, biometric credentials, etc.) to authenticate a user of the client device 501. In some cases, the authentication credentials 534 or other information identifying successful authentication are returned to the authentication service 506. In some cases, the authentication credentials 534 may be signed by the public key, but may also be encrypted using transport layer security (TLS). At block 536, the authentication service 506 receives the authentication credentials 534 and saves session information identifying the client device 501 and the user. This description also presumes that the authentication service 506 also verifies that the access to the requested resource (e.g., the application 502) is permitted. After successful authentication and storing of the session information, the authentication service 506 sends an authentication response 538 to the application 502 granting access to the requested resources.

Figure 6:
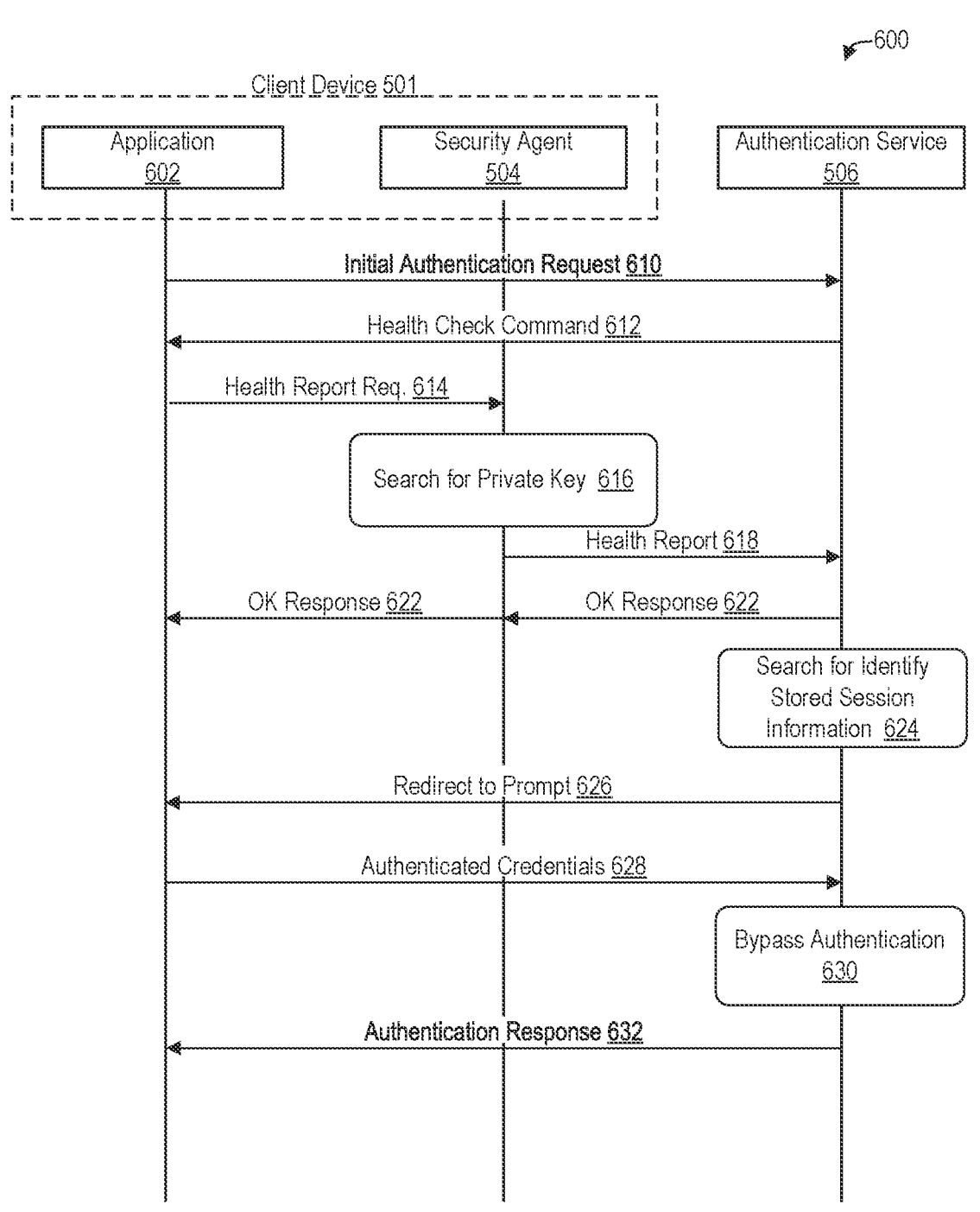
FIG. 6 illustrates a sequence diagram illustrating retrieval of a shared session in accordance with some aspects of the disclosure.

FIG. 6 illustrates a sequence diagram 600 illustrating creation of a shared session after a session information in an authentication service in accordance with some aspects of the disclosure. In some aspects, a client device 501 may include an application 602 that is configured to authenticate with the authentication service 506 in connection with the security agent 504. In this case, the application 602 is a different application than the application 502, and the application 502 triggered the creation of a stored session in the authentication service 506 and a public key as illustrated in FIG. 5. However, the application 602 may also be application 502 in some cases. For example, the application 502 and the application 602 may be applications that execute in a sandbox environment such as a web browser. The application 502 and the application 602 may also be different native applications.

When the application 602 initializes, the application 602 sends an initial authentication request 610 to the authentication service 506 for pre-authentication processes and such. The authentication service 506 sends a health check command 612 to the application 602. The application 602 then sends a health report request 614 to the security agent 504. The health report request 614 may include user information that uniquely identifies the user to the security agent 504.

The security agent 504 in turn searches for a private key associated with the user information at block 616. In this case, because the private key was created and stored in the security agent 504, the security agent 504 sends a signed health report 618 to the authentication service 506. The signed health report 618 includes the shared token and the user information. As noted above, the DHA 606 returns an OK response 622 indicating successful reception.

At block 624, the authentication service 506 authenticates the security agent 504 based on the signature and then searches for session information stored at the DHA 606 that matches the user information and the shared token. In some cases, the session information can also be identified based on the user information or the shared token. The authentication service 506 identifies the stored session information that corresponds to the client device 501 and a previous authentication. In some cases, block 624 can include additional operations, such as identifying the health of the authentication. For example, an authentication performed outside of a 12-hour window may deemed to be stale.

In this case, the authentication service 506 may provide a redirect to prompt 626 that requests the application 602 to send information that further validates the authenticity of the client device 501 and the user. The application 602 searches for, identifies, and responds with authentication credentials 628 based on the redirect to prompt 636. For example, the authentication credentials 628 may include a trusted cookie that the provided by the authentication service 506 as part of the authentication in FIG. 5, and the user has no part of this process. At block 630, the authentication service 506 is configured to receive the authentication credentials 628 and verify that the authentication credentials 628 are valid based on information corresponding to the stored session information in the authentication service 506. After validating the authentication credentials 628, the authentication service 506 sends an authentication response 632 indicating that the application 602 is authenticated.

In some aspects, the method illustrated in FIG. 6 may be an initial authentication of the application 602, which is different from the application 502. In other cases, when two credentials are needed, an additional authentication may be required (e.g., biometric credentials, etc.). The method enables sharing of credentials across applications to reduce the number of authentications based on a shared token that is separate from the authentication of the application and the authentication service. The security agent 504 is configured to generate the shared token and does not expose the shared token to any application in the client device 501.

In another aspect, the shared token can be omitted in some cases when an asymmetric key-pair is used. In FIGS. 5 and 6, an asymmetric key-pair is generated on device registration with the authentication service. In other cases, the asymmetric key-pair may be generated at different events, such as user login, user reauthentication, login to the security agent, after power cycling, or after a fixed period of time or inactivity. In these cases, the asymmetric key-pair may be rotated during these events and the shared token may be omitted. In this case, the presence of a valid cryptographic signature from a private key backed by a TPM indicates that the security agent health report came from the same device, and can be used to lookup an existing stored session and skip authentication.

FIG. 7 illustrates an example method 700 for generating a shared authentication session. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, a computing system (e.g., the computing system 900 of FIG. 9) may initiate a multifactor authentication process based on an authentication. For example, when the first application starts, the computing system may receive a transaction identifier associated with the first application. In this case, a security agent may receive the transaction identifier and determine whether a shared token is available. In the event a shared token is unavailable, the security agent generates a new shared token. The security agent is configured to transmit a health report to the authentication service with the health report and the shared token and the transaction identifier. In some cases, the health report may be signed at the security agent based on a private key, and the authentication service can validate the authenticity of the health report based on a public key. As described above, a different application is configured to use the shared key to associate application sessions with a previous authentication.

At block 705, the computing system may receive a request to check an authentication status from a first application, the request including user information that uniquely identifies a user and device. For example, the user information may include a transaction identifier.

At block 710, the computing system may search for the shared information corresponding to the user information. In some cases, the shared information may be a shared token that is only shared between the security agent and the authentication service. The shared token that is provided to the authentication service is used to identify a stored session of authentication access from a client device. When the public key method is used in contrast to the shared token, a nonce may be generated by the authentication service and signed in an assertion using the private key and may be used by the client device to identify a stored session of authentication access. The shared information may also be a public key that is provided to the authentication service, and is used to identify a stored session of authentication access from a client device. The security agent may store a private key corresponding to the public key and the client device uses the private key to generate a signature. The private key uniquely identifies the user and device and may be used in place of the shared token. For example, the client device may generate a signature with the private key that can be validated by the authentication service using the public key. A hardware security module of the client device may store the private key that only provides the security agent access to the private key. In one aspect, the computing system can generate two separate asymmetric keypairs. A first asymmetric keypair can be associated with the device and a second asymmetric keypair can be associated with a user. The second asymmetric keypair is shared across the device in the case of multiple users using the security agent. In this case, the authentication service can selectively revoke trust in the entire device, or only a single user on that device. In the case, the pair of public keys uniquely identifies the user and device.

At block 715, the computing system may generate the shared information based on the availability of the shared information at the security agent. In some cases, for example upon initiation of the security agent, the shared information may not be stored or a new user information may be provided. In that case, the computing system may use the security agent to generate shared information corresponding to the user information. The computing system may provide a first message to the authentication service including the user information and the shared information At block 720, the computing system may provide first authentication credentials related to a first authentication to the authentication service. The first authentication may be associated with the first message and may require at least one authentication with one source. In some cases, additional authentication may happen after block 720, such as an authentication using a different source (e.g., a text message, etc.).

At block 725, the computing system may receive a message related to a second authentication to bypass the second authentication. For example, the second authentication may be different from the first application. The shared information can be used to skip at least one authentication of the second application. For example, a second authentication factor can be omitted. In some aspects, the first authentication and the second authentication are associated with a first application, and an authentication type of the first authentication is different from an authentication type of the second authentication. In other aspects, first authentication is associated with a first application and the second authentication is associated with a second application.

At block 705, the computing system may, in response to receiving a request to check an authentication status from a first application, transmit an authentication health request to an authentication service. The authentication service is configured to retrieve stored information from a database pertaining to the first application. For example, the transaction identifier identifies an instance of the first application. In this case, if the application restarts (i.e., is a different instance), authentication service will not be able to identify the information of the previous instance.

At block 710, the computing system may receive an authentication health report including a shared token from the authentication service. In this case, a different application is configured to receive the authentication health report, determine whether the first session token is associated with the shared token, and determine whether to perform the second authentication. In one example, a separate authentication assistant application may receive the authentication health report. In another example, an API on the computing system that is configured to operate with the first application, may receive the authentication health report.

In some aspects, the authenticity of the shared token in the authentication health report may need to be verified. In this case, the computing system (e.g., executing the different application) may authenticate that the shared token is generated by the DHA based on a cryptographic signature in the authentication health report. The DHA and the different application may not be configured to interoperate locally and may use the authentication health service to provide separation and increase security.

At block 715, the computing system may determine whether a first session token associated with the first application is associated with the shared token. The first session token can be associated with the shared token, such as being signed by the shared token. Successfully decrypting the first session token indicates the validity of the authentication.

At block 720, the computing system may determine whether to perform a second authentication for the first application based on the first session token being associated with the shared token. For example, the second authentication comprises a multifactor authentication that is separately input from a first authentication of a user. Non-limiting examples of multifactor include a hash-based key generated by an authentication application, a random key provided via a different communication medium that requires a different authentication to access the random key (e.g., text messaging, email, etc.), a hardware encryption key, and so forth. Based on the existence of the first session token and its association with the shared token, the computing system can skip the second authentication.

At block 725, the computing system may, in response to receiving authentication information from a second application, determine whether to perform a supplemental authentication for the second application based on the shared token. For example, when a second application is executed that is configured to use the authentication service, the presence of the shared token indicates the authenticity of a previous authentication, and the computing system may omit a supplemental authentication of the second application.

The computing system may also be configured to determine validity of the shared token based on a last time the second authentication was provided. For example, the shared token may expire after a period of time (e.g., 12 hours) based on a timestamp and may require the user to refresh the authentication based on a multifactor authentication.

Figure 8:
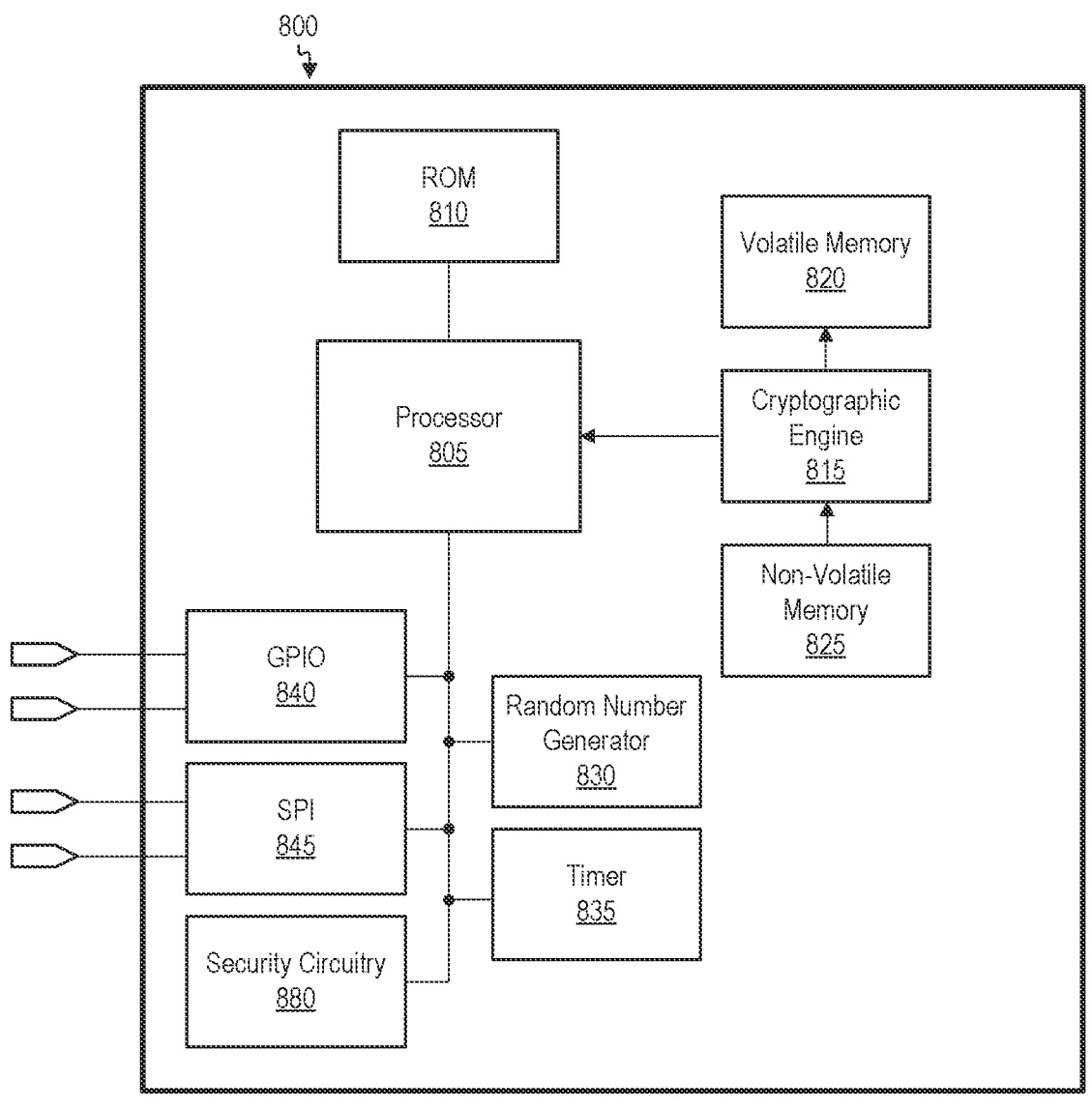
FIG. 8 shows an example of a trusted platform module (TPM) in accordance with some aspects of the disclosure.

FIG. 8 illustrates an example block diagram of a TPM 800. The TPM 800 includes a processor 805 that cannot be accessed directly. The processor 805 is connected to a read only memory (ROM) program 810 that provides secure instructions to securely boot and operate the TPM 800.

The TPM 800 includes a cryptographic engine 815 that connects a volatile memory 820 (e.g., SRAM) and a non-volatile memory 825 (e.g., a flash memory) to the processor 805. The cryptographic engine 815 securely encrypts and decrypts data stored in either the volatile memory 820 or the non-volatile memory 825 and performs cryptographic hash functions and other iterative processes that can be performed by a dedicated hardware implementation. In the example illustrated in FIG. 8, the cryptographic engine 815 is placed in series with the volatile memory 820 or the non-volatile memory 825 to perform encryption and decryption before the data is received by the processor 805. In other examples, the cryptographic engine 815 may be placed in series so that the processor 805 fetches and stores encrypted data and calls the cryptographic engine 815 to decrypt or encrypt data directly within the processor 805. The volatile memory 820 and the non-volatile memory 825 are configured to be inaccessible by outside of the TPM 800.

The TPM 800 also includes a random number generator (RNG) 830 that generates a sequence of numbers or symbols that cannot be reasonably predicted better than by a random chance. The RNG 830 can be implemented as truly random hardware random-number generators to generate random numbers as a function of current value of some physical environment attribute that is constantly changing in a manner that is practically impossible to model. The RNG 830 can also be a pseudorandom number generators and generates numbers that look random but are deterministic.

The TPM 800 also includes a timer 835 to perform timing functions in connection with various security functions (challenge/response) of the TPM $00. The TPM 800 also include a general purpose input/output (GPIO) 840 for sending and receiving data. The TPM 800 also includes a serial peripheral interface (SPI) for sending and receiving data. In some cases, the SPI 845 can be configured in child mode that requires a parent SPI interface to provide instructions to control the communication interface.

The TPM 800 also includes security circuitry 850 to detect tampering and other anomalous events. For example, the security circuitry 850 may include voltage and temperature tampers, an active shield, and other physical security measures that would indicate that the TPM 800 is being physically altered. The security circuitry 850 cause the processor 805 to output information via GPIO 840 and SPI 845 to indicate that the TPM 800 was compromised and the TPM 800 cannot be trusted. The security circuitry 850 can also wipe sensitive data in a secure manner.

The TPM 800 is configured to perform power-on self-tests when booted or reset. First, the TPM 800 performs a self-test to verify the RNG 830 and secure hash algorithm (SHA) capabilities for secure boot operations. After self-test verification, the remaining tests verify the integrity of the remaining system components.

In addition, the TPM 800 can be configured in any number of devices that require a level of physical and digital security. For example, TPM 800 can be implemented by any device that requires physical and digital security (e.g., processors, logic circuits, networking equipment, mobile phones, tablet devices, flash memory devices, cryptographic authenticators, displays, printers, etc.).

Figure 9:
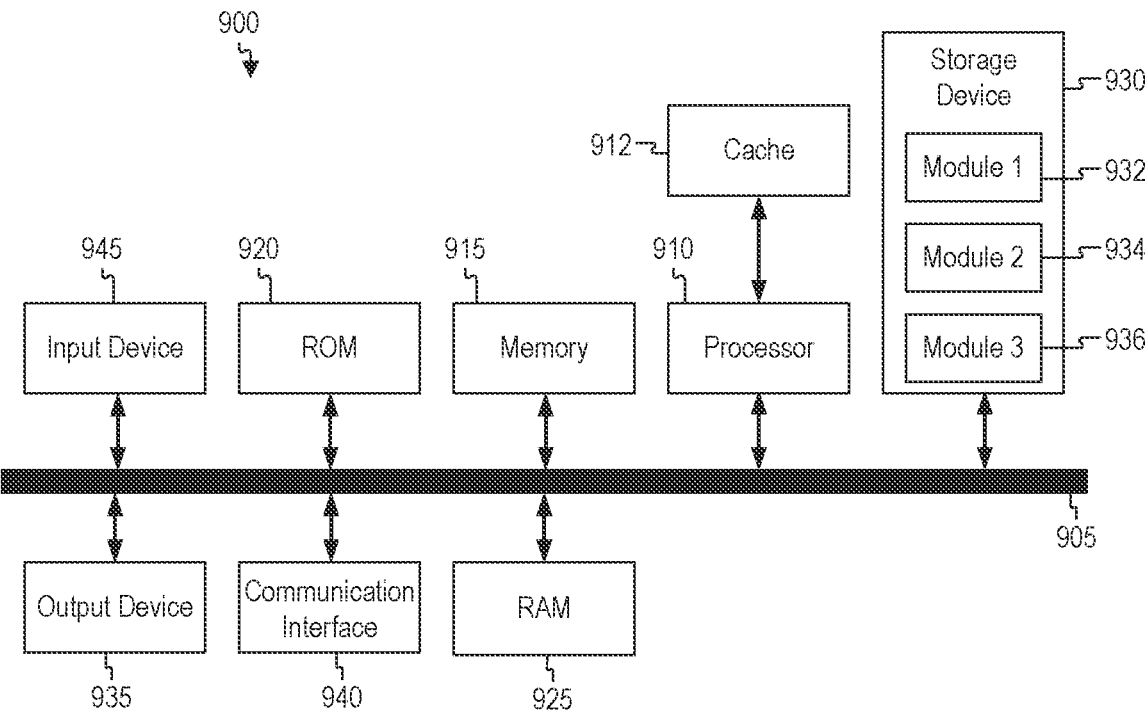
FIG. 9 shows an example of a system for implementing certain aspects of the present technology in accordance with some aspects of the disclosure.

FIG. 9 shows an example of computing system 900, which can be for example any computing device making up a client device, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative aspects of the disclosure include:

Aspect 1. A method of sharing authentication using an authentication service, the method comprising: in response to receiving a request to check an authentication status from a first application, transmitting a first message to an authentication service including shared information; providing first authentication credentials related to a first authentication to the authentication service; and receiving a message related to a second authentication to bypass the second authentication.

Aspect 2. The method of Aspect 1, wherein the first authentication and the second authentication are associated with a first application, and an authentication type of the first authentication is different from an authentication type of the second authentication.

Aspect 3. The method of any of Aspects 1 to 2, wherein the first authentication is associated with a first application and the second authentication is associated with a second application.

Aspect 4. The method of any of Aspects 1 to 3, wherein the shared information comprises a shared token that is provided to the authentication service, and wherein the shared token is used to identify a stored session of authentication access from a client device.

Aspect 5. The method of any of Aspects 1 to 4, wherein the shared information comprises a public key that is provided to the authentication service, and wherein the shared token is used to identify a stored session of authentication access from a client device.

Aspect 6. The method of any of Aspects 1 to 5, wherein a private key corresponding to the public key generates a signature for message provided to the authentication service.

Aspect 7. The method of any of Aspects 1 to 6, wherein the first message includes user information and the shared information, wherein the user information identifies a user and a client device.

Aspect 8. The method of any of Aspects 1 to 7, further comprising: receiving a request from a first application at a security agent on the client device, the request including user information; searching for the shared information corresponding to the user information; and when the security agent determines that shared information is unavailable, generating the shared information by the security agent.

Aspect 9. The method of any of Aspects 1 to 8, wherein a hardware security module stores the private key and only provides the security agent access to use the private key.

Aspect 10. The method of any of Aspects 1 to 9, further comprising: receiving a request from a first application at a security agent on the client device, the request including user information; searching for the shared information corresponding to the user information, wherein the first message comprises the first information identified by the security agent based on the user information.

Aspect 11. A system for sharing authentication using an authentication service includes a storage (implemented in circuitry) configured to store instructions and a processor. The processor configured to execute the instructions and cause the processor to: in response to receiving a request to check an authentication status from a first application, transmit a first message to an authentication service including shared information; provide first authentication credentials related to a first authentication to the authentication service; and receive a message related to a second authentication to bypass the second authentication.

Aspect 12. The system of Aspect 11, wherein the first authentication and the second authentication are associated with a first application, and an authentication type of the first authentication is different from an authentication type of the second authentication.

Aspect 13. The system of any of Aspects 11 to 12, wherein the first authentication is associated with a first application and the second authentication is associated with a second application.

Aspect 14. The system of any of Aspects 11 to 13, wherein the shared information comprises a shared token that is provided to the authentication service, and wherein the shared token is used to identify a stored session of authentication access from a client device.

Aspect 15. The system of any of Aspects 11 to 14, wherein the shared information comprises a public key that is provided to the authentication service, and wherein the public key is used to identify a stored session of authentication access from a client device.

Aspect 16. The system of any of Aspects 11 to 15, wherein a private key corresponding to the public key generates a signature for message provided to the authentication service.

Aspect 17. The system of any of Aspects 11 to 16, wherein the first message includes user information and the shared information, wherein the user information identifies a user and a client device.

Aspect 18. The system of any of Aspects 11 to 17, wherein the processor is configured to execute the instructions and cause the processor to: receive a request from a first application at a security agent on the client device, the request including user information; search for the shared information corresponding to the user information; and when the security agent determines that shared information is unavailable, generate the shared information by the security agent.

Aspect 19. The system of any of Aspects 11 to 18, wherein a hardware security module stores the private key and only provides the security agent access to use the private key.

Aspect 20. The system of any of Aspects 11 to 19, wherein the processor is configured to execute the instructions and cause the processor to: receive a request from a first application at a security agent on the client device, the request including user information; and search for the shared information corresponding to the user information, wherein the first message comprises the first information identified by the security agent based on the user information.

What is claimed is:

1. A method of sharing authentication using an authentication service, the method comprising:

in response to receiving a request to check an authentication status from a first application, transmitting a first message to an authentication service including shared information;

providing first authentication credentials related to a first authentication to the authentication service;

receiving a message related to a second authentication to bypass the second authentication;

receiving a request from the first application at a security agent;

searching for the shared information corresponding to the request; and when the security agent determines that the shared information is unavailable, generating the shared information by the security agent.

2. The method of claim 1, wherein the first authentication and the second authentication are associated with the first application, and an authentication type of the first authentication is different from an authentication type of the second authentication.

3. The method of claim 1, wherein the first authentication is associated with the first application and the second authentication is associated with a second application.

4. The method of claim 1, wherein the shared information comprises a shared token that is provided to the authentication service, and wherein the shared token is used to identify a stored session of authentication access from a client device.

5. The method of claim 1, wherein the shared information comprises a public key that is provided to the authentication service, and wherein the public key is used to identify a stored session of authentication access from a client device.

6. The method of claim 5, wherein a private key corresponding to the public key generates a signature for message provided to the authentication service.

7. The method of claim 1, wherein the first message includes user information and the shared information, wherein the user information identifies a user and a client device.

8. The method of claim 7, further comprising:

wherein the request including the user information.

9. The method of claim 1, wherein a hardware security module stores a private key and only provides the security agent access to use the private key.

10. The method of claim 1, wherein the first message comprises first information identified by the security agent based on user information.

11. A system for sharing authentication using an authentication service, comprising:

a storage configured to store instructions; and a processor configured to execute the instructions and cause the processor to:

in response to receiving a request to check an authentication status from a first application, transmit a first message to an authentication service including shared information;

provide first authentication credentials related to a first authentication to the authentication service;

receive a message related to a second authentication to bypass the second authentication;

receive a request from the first application at a security agent;

search for the shared information corresponding to the request; and when the security agent determines that the shared information is unavailable, generate the shared information by the security agent.

12. The system of claim 11, wherein the first authentication and the second authentication are associated with the first application, and an authentication type of the first authentication is different from an authentication type of the second authentication.

13. The system of claim 11, wherein the first authentication is associated with the first application and the second authentication is associated with a second application.

14. The system of claim 11, wherein the shared information comprises a shared token that is provided to the authentication service, and wherein the shared token is used to identify a stored session of authentication access from a client device.

15. The system of claim 11, wherein the shared information comprises a public key that is provided to the authentication service, and wherein the public key is used to identify a stored session of authentication access from a client device.

16. The system of claim 15, wherein a private key corresponding to the public key generates a signature for message provided to the authentication service.

17. The system of claim 11, wherein the first message includes user information and the shared information, wherein the user information identifies a user and a client device.

18. The system of claim 11, wherein the request including user information.

19. The system of claim 11, wherein a hardware security module stores a private key and only provides the security agent access to use the private key.

20. The system of claim 11, wherein the first message comprises first information identified by the security agent based on the user information.

* * * * *